May 3, 1960  G. A. LYON  2,935,360
WHEEL COVER
Filed March 30, 1956  4 Sheets-Sheet 1
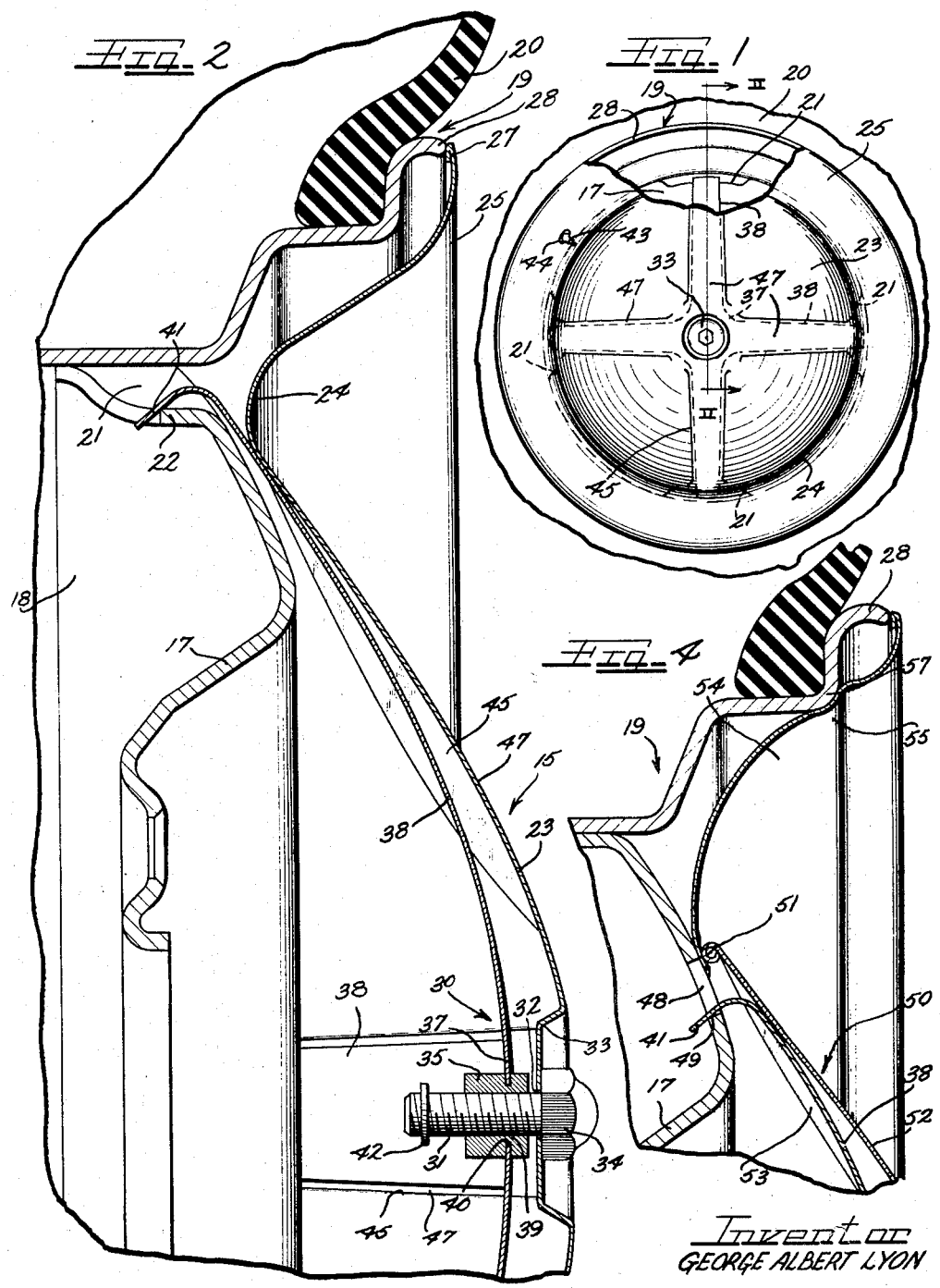
Inventor
GEORGE ALBERT LYON

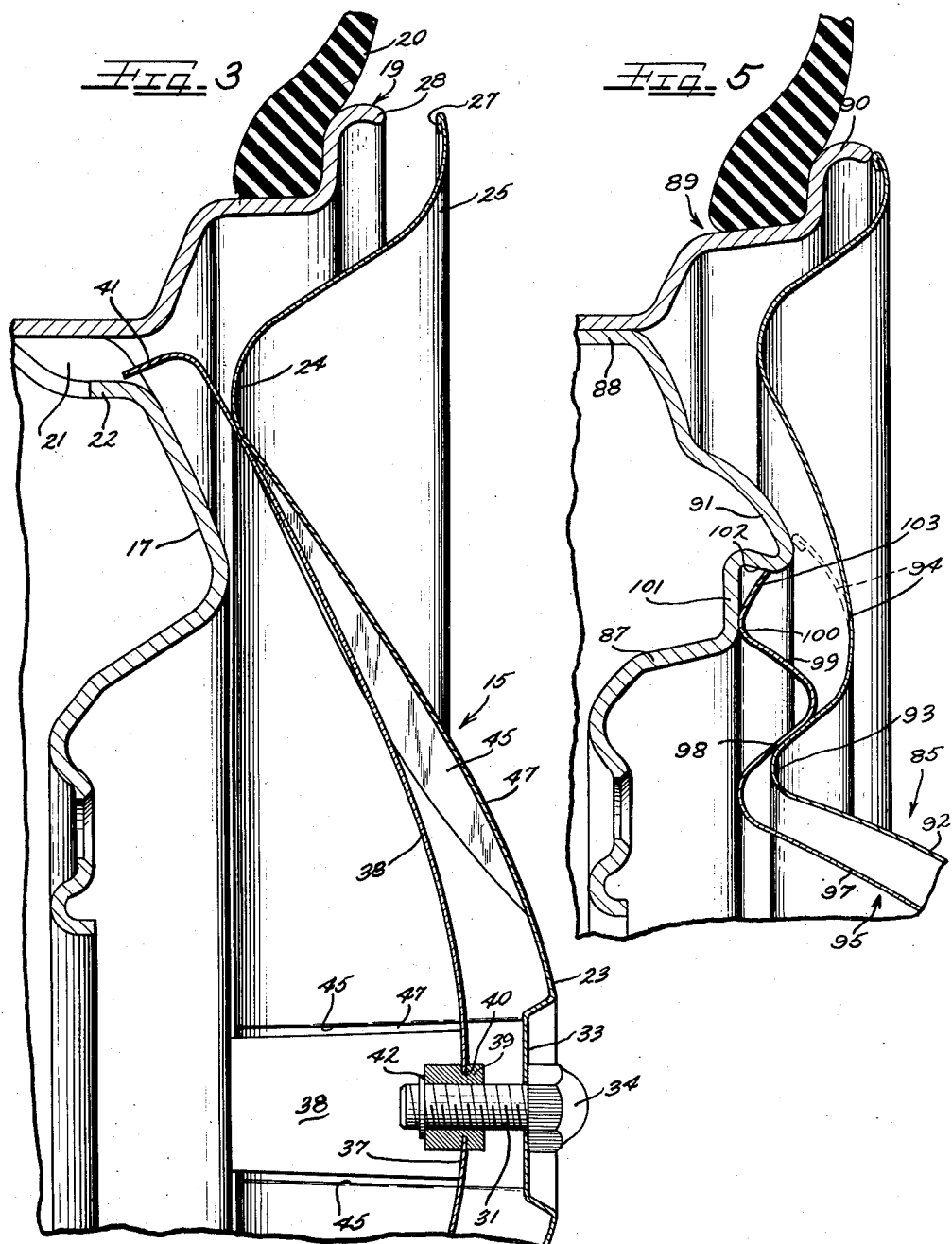

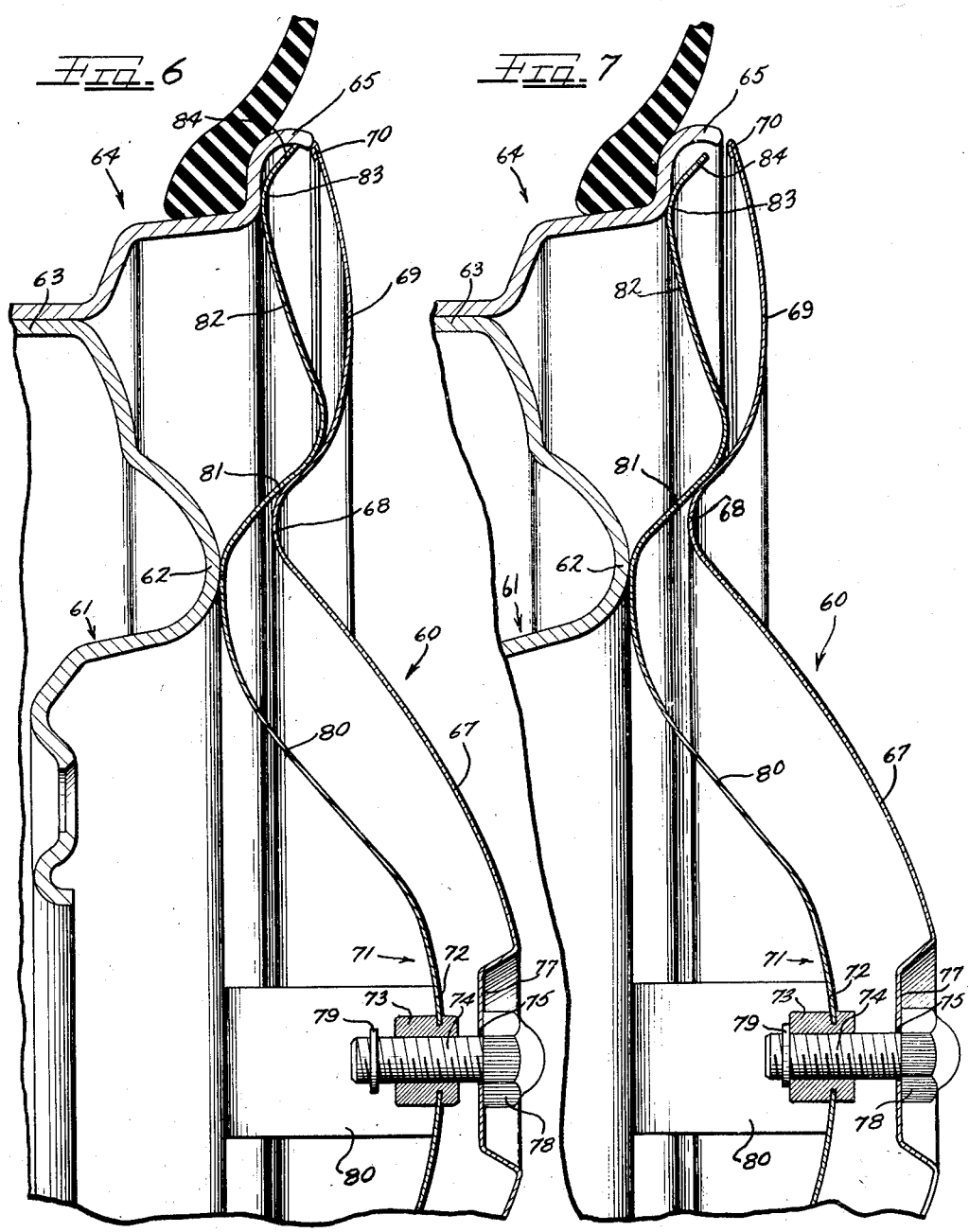

May 3, 1960  G. A. LYON  2,935,360
WHEEL COVER
Filed March 30, 1956  4 Sheets-Sheet 4
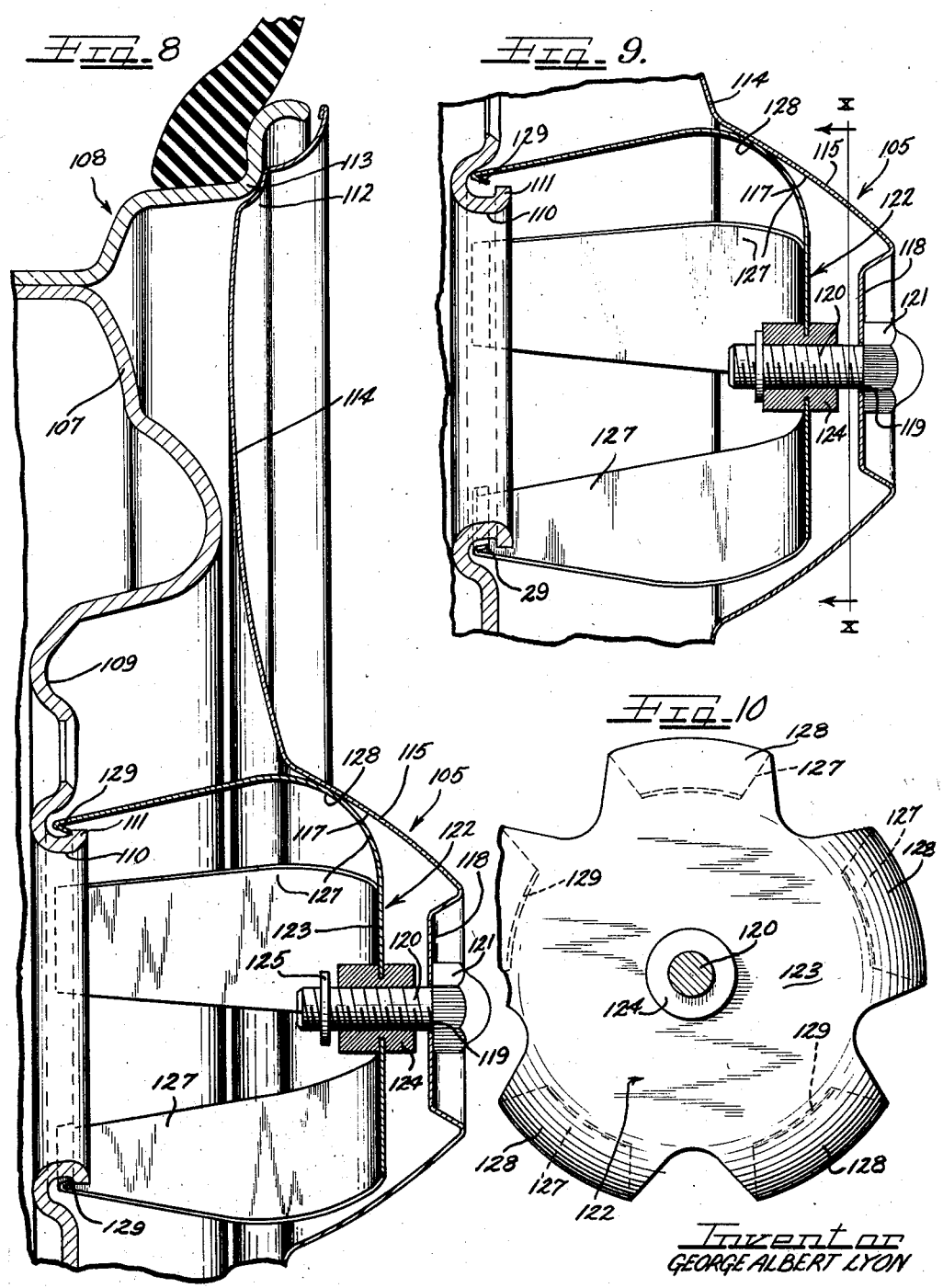

United States Patent Office 2,935,360
Patented May 3, 1960

2,935,360
WHEEL COVER

George Albert Lyon, Detroit, Mich.

Application March 30, 1956, Serial No. 575,100

7 Claims. (Cl. 301—37)

The present invention relates to improvements in wheel structures and more particularly concerns the ornamental and protective covering of the outer sides of vehicle wheels.

An important object of the present invention is to provide a wheel structure having novel cover means for disposition at the outer side of the wheel.

Another object of the invention is to provide an improved wheel cover for disposition at the outer side of a vehicle wheel and provided with novel cover retaining means.

A further object of the invention is to provide improved retaining means for vehicle wheel covers.

Yet another object of the invention is to provide a wheel cover with improved retaining means by which the cover is held quite positively upon the wheel to which applied and in a manner which will discourage theft of the cover.

It is a further object of the invention to provide a novel wheel cover and retaining means therefor which will readily lend itself to locking the same positively against theft of the cover.

In accordance with the features of the invention there is provided a plurality of forms of the invention in each of which there is provided a wheel structure including a wheel body, a tire rim supported thereby, and cover retaining shoulder structure, a cover for disposition at the outer side of the wheel including an obliquely dished cover body having therebehind an armed spring cover retainer manipulable for axial movement behind the cover and a plurality of generally radially extending arms having wheel engaging terminals engageable with the retaining shoulder structure on the wheel, the arms, intermediate the terminals and the retainer, being backed up by sliding abutment against an oblique portion of the cover body and being thus cammingly movable both radially and axially of the wheel into and out of sliding engagement with the shoulder structure upon axial movement of the retainer.

In addition, in the first two forms of the invention the cover has therebehind guide channels in which arms are slidable. These channels radially embrace the arms in shouldered relationship so as to prevent relative rotation of the cover body and the armed cover retainer.

In the following specification and claims the outer side of the cover is that which faces outwardly and is visible and the inner, back or rear side of the cover is the underneath side which is not visible; and in all instances the radial and axial movement of the retaining arms projecting from the central axially movable element is on the underside or back of the cover so that the same are concealed by the cover proper. The oblique surface or portion engaged by the arms is also on the underside of the cover body.

In addition, in all forms of the invention the cover retaining shoulder structure or means on the wheel is on the wheel body. This shoulder structure is referred to in the specification as the inset portion, edge, flange retaining shoulder, or lip in the five different described species.

Other objects, features and advantages of the present invention will be readily apparent from the following detailed description of certain preferred embodiments thereof taken in conjunction with the accompanying drawings in which:

Figure 1 is an outer side elevational view of a wheel structure embodying features of the invention, with a portion of the cover broken away to show details of structure therebehind;

Figure 2 is an enlarged fragmentary radial sectional detail view taken substantially on the line II—II of Figure 1;

Figure 3 is a sectional detail view similar to Figure 2 but showing the cover in the process of being applied or removed relative to the outer side of the wheel;

Figure 4 is a fragmentary radial sectional view through a modified wheel structure;

Figure 5 is a fragmentary radial sectional view through a further modification;

Figure 6 is a radial sectional view through still another modification;

Figure 7 is a radial sectional detail view similar to Figure 6 but showing the cover in process of being either applied or removed relative to the wheel;

Figure 8 is a fragmentary radial sectional view through a further modified wheel structure;

Figure 9 is a fragmentary transverse sectional view showing the central portion of the cover and the cover retaining means of Figure 8 as it appears incident to removal or attachment of the wheel cover; and Figure 10 is a sectional elevational view taken substantially along the line X—X of Figure 9 and showing the cover retaining spring gripping member.

A wheel cover 15 embodying features of the invention is adapted to be applied to the outer side of a conventional automobile wheel including a disk spider wheel body 17 having an outer marginal axially extending bolt-on flange 18 by which the wheel body is attached to a base flange of a multi-flange tire rim 19 which supports a pneumatic tire 20. At suitable intervals such as four, the attachment flange 18 is inset to provide chain slots or ventilation openings 21 through the wheel, the openings being defined by inset portions 22 of the flange 18.

Herein the wheel cover 15 comprises a circular cover plate made from suitable sheet material such as stainless steel, brass, aluminum or the like stamped or drawn to shape and including a central crown portion 23 for overlying the wheel body and joined by an indented or dished annular intermediate portion 24 to an outer tire rim covering annular generally ribbed marginal portion 25 that has the terminal extremity edge thereof turned under to provide a reinforcing and finishing flange 27 which in assembly with the wheel is adapted to bear against a terminal flange extremity 28 of the tire rim.

For retaining the cover 15 on the wheel, a spring clamp or gripping retainer 30 is provided which is constructed and arranged for engagement with a part of the wheel by turning a securing member such as a bolt 31 the shank of which projects through a suitable central aperture 32 preferably located centrally within a central inset seat or depression 33 in the cover crown 23. A bolt head 34 is accessible within the recess 33 by means of a suitable wrench for turning the bolt 31. The bolt head 34 may be of a special size or shape so as to be operably engageable only by means of a special wrench, or it may be of a size to be operable by the same wrench by which the usual bolts are manipulated for attaching the wheel body 17 to the axle structure of the vehicle to which the wheel may be applied.

At the inner side of the cover 15, the shank of the bolt 31 is threadedly engaged with a tapped boss portion or element 35 carried centrally of a retaining member body 37 from which extends a series of resilient cover retaining gripper arms 38. In a convenient form, the tapped boss 35 comprises a nut member having an axial attachment neck 39 projecting through a central aperture 40 in the retainer member body 37 and peened over or upset or otherwise secured into retained, gripping, or clamping relation to the margin defining the aperture 40. The member 30 is adapted to be made from suitable spring steel or other spring sheet material.

Each of the cover retainer arms 38 is of a length to extend, in the centered relation of the cover 15 to the outer side of the wheel, to one of the wheel openings 21. Since there are four of the openings 21 in the example shown, there are four of the arms 38. At its distal or radially outer terminal portion, each of the arms 38 is provided with a generally inwardly turned, axially and radially inwardly obliquely directed retaining finger terminal flange 41 engageable with the inset body flange portion 22 defining the respective wheel opening.

By preference, the cover retainer arms 38 are maintained normally under tensioned generally axially inwardly deflected condition relative to the body 37 of the retainer 30. This is accomplished by maintaining the cover retainer body 37 drawn toward the inset portion 33 of the cover crown by the engagement of the bolt 31 with the nut 35, and with the radially outer end portions of the arms 38 bearing cammingly against the back of the cover and more particularly against the radially inner side of the annular dished intermediate portion 24 of the cover. The length of the shank of the bolt 31 is such that when the nut 35 is disposed at the axially innermost end portion of the bolt shank, as limited by a stop collar 42 affixed to the bolt shank (Fig. 3) the retaining finger terminals 41 of the retainer arms are disposed at their tips on a larger diameter than the outside diameter described about the wheel body inset flange portions 22. In such relationship the cover 15 can be applied to or removed from the wheel freely since the retaining flange fingers 41 will clear freely into and out of the wheel openings 21.

In applying the cover 15 to the outer side of the wheel, a valve stem 43 (Fig. 1) is registered through a valve stem opening 44 and the cover is pressed axially inwardly into centered position on the wheel which is generally effected by entry of the retaining finger terminals 41 within the wheel openings 21. The axially inward limit movement of the cover toward the wheel is attained when the underturned marginal terminal flange 27 of the cover engages the tire rim terminal flange 28. In this relationship the annular intermediate dished portion 24 of the cover is located in spaced, clearance relation to the wheel body 17 adjacent to the wheel openings 21. The cover retaining arms 38 extend freely through such space or clearance and are reciprocably movable therein as shouldered under tension against the cover portion 24. Completion of attachment of the cover to the wheel is accomplished by turning the bolt 31 as by engaging the head 34 thereof with a suitable wrench to screw up the threaded boss or nut 35 to thereby back it away from the stop collar 42 and thus draw the retainer body 37 axially outwardly toward the inwardly embossed or inset portion 33 of the cover crown. This causes the resilient retaining arms 38 not only to be placed under increased resilient tension but also causes the arms to bow axially outwardly to a smaller radius on the sliding, camming fulcrum provided by the shoulder of the intermediate cover portion 24. As a result, the retaining terminal fingers 41 of the retaining arms swing generally radially inwardly into underlying or gripping relation behind the edges of the respective inset flange portions 22 of the wheel body. At the same time there is a certain amount of radially inward drawing of the retaining arm terminals whereby the retaining fingers 41 are drawn tightly against the inset flange portion edges and consequent axially inward tensioned drawing of the cover 15 toward the wheel. It will be observed that the retaining arms 38 through the retaining terminal fingers 41 maintain the cover not only centered but firmly seated at the terminal flange 27 of the cover against the tire rim terminal flange 28.

Release of the cover from the attached condition thereof as shown in Fig. 2 is easily effected by applying the proper wrench to the bolt head 34 and turning the bolt in reverse to return the tapped boss or nut 35 toward the axially inner end portion of the bolt and thus relax the retaining spring member 30 for springing straightening of the arms 38 and backing off of the retaining terminals 41 from the inset cover flange portions 22, until the retaining terminals 41 clear the inset flange portions 22 and the cover can be lifted away from the wheel.

Since it is highly desirable to prevent any appreciable turning of the cover 15 on the wheel, so as to avoid distortion of the valve stem 43, means are provided for torsionally interlocking the cover plate and the retaining arms 38. To this end, the cover crown portion 23 is provided with opposed shoulders 45 provided either by depressing portions of the crown or outwardly pressing or embossing portions of the crown to provide generally radial ribs 47 defining, at the inside of the cover, channels, the side walls of which afford the opposing shoulders 45 between which the retainer arms 38 are disposed. Thereby the cover plate is held against turning relative to the retainer spring member 30. Since the arms 38 interlock at their terminal fingers 41 within the wheel openings 21 any appreciable turning of the cover on the wheel is avoided.

In the modification of Fig. 4 an arrangement is shown wherein the same principles are employed as in the cover of Fig. 2, but the wheel body 17 is provided with suitable apertures 48 in an intermediate or nose bulge portion thereof for receiving the retaining terminal fingers 41 of the respective spring retainer arms 38. In this instance, of course, the arms 38 are substantially shorter than in Fig. 2 and the retaining terminal fingers 41 engage behind radially inner edges or margins 49 defining the respective openings 48. There may be three to five of the openings 48, as preferred.

Moreover, in the form of Fig. 4, the wheel cover comprises a hub cap type circular cover body 50 of a diameter to engage at its extremity defined by an underturned reinforcing and finishing bead 51 against the wheel body radially outwardly from the openings 48. The outer end portions of the arms 38 have fulcrum shouldering camming engagement with the inner side of the cover plate preferably within radial channel ribs 52 between opposed turn preventing radial shoulders 53.

Although the cover 50 may be used by itself on the wheel, it may be desirable to provide in addition thereto a trim ring 54 of a diameter to underlie at its radially inner margin the terminal bead 51 of the cover member 50, while a radially outer marginal portion of the trim ring is provided with a shoulder 55 for centering engagement against an annular shoulder 57 of the tire rim 19. In other words, the trim ring 54 is an optional member of the cover assembly.

Operation of the cover 50 will be effected the same as the cover 15 as hereinabove described.

Referring now to Figures 6 and 7, a cover 60 is shown wherein as an incident to drawing up an armed spring retainer, a thrusting interengagement of retainer arms against a portion of the wheel is effected rather than a drawing interengagement with a portion of the wheel. To this end, the cover 60 is adapted to be applied to the outer side of a wheel embodying a wheel body 61 having an intermediate axially outwardly directed annular nose bulge 62 and provided with an axially inwardly directed annular outer marginal attachment flange 63 for attachment to the base flange of a tire rim 64 which includes a generally radially outwardly and then axially outwardly turned terminal flange 65.

The cover 60 includes a central crown portion 67 leading into an annular indented or dished portion 68 for generally overlying the radially outer side of the nose bulge 62 of the wheel body and joining at its radially outer side a marginal cover portion 69 for overlying the tire rim and arranged to engage at an underturned outer marginal reinforcing and finishing bead flange 70 against the tip of the terminal flange 65. Thereby, in assembly of the cover on the wheel, the intermediate inwardly dished portion 68 of the cover is maintained in substantial spaced relation to the nose bulge 62.

For retaining the cover 60 on the wheel, armed retaining spring member 71 is provided having a central body 72 carrying an internally threaded boss or attached nut 73 through which is threaded an operating bolt 74 that extends axially through an aperture 75 within an indented or recessed portion 77 of the cover crown 67 and has a head 78 engageable by means of a suitable wrench for turning the bolt. Adjacent its axially inner end the bolt 74 has a stop collar 79. Upon drawing the threaded boss 73 and thereby the retainer body 72 axially outwardly toward the cover crown by turning of the bolt 74, causes radially extending spring arms 80 to be flexed toward the crown 67 and thus causes intermediate generally axially and radially outwardly turned fulcruming and camming portions 81 of the arms to slidably, cammingly fulcrum on the radially outer portion of the intermediate cover portion 68. Thereby radially outer generally radially outwardly and axially inwardly directed arm portions 82 are caused to cam slidably radially outwardly at turned shoulders 83 thereof against the radially extending portion of the terminal flange 65 and to engage with radially outwardly thrusting generally biting engagement with the axially extending portion of the terminal flange at the tips of respective generally radially and axially outwardly turned terminal flange fingers 84 of the arms. In other words, as an incident to axially outward drawing of the retainer spring member 72 causes spreading of the arms 80 as they are flexed to thrust the tips of the terminals 84 into retaining engagement with the tire rim flange 65 from a normally smaller diameter described about the tips of the retaining fingers (Fig. 7).

For removing the cover 60 from the wheel, the bolt 74 is turned to loosen the nut 73 and back the same away from the cover crown whereby to relax the spring retainer 71 and permit the camming finger portions 81 to spring toward normal radially inward contracted position thereof and thus cam axially inwardly along the cam shoulder provided by the cover portion 68 whereby to draw the retaining fingers 84 radially inwardly clear of the terminal flange 65. In applying the cover to the wheel, as seen in Fig. 7, the reverse action is effected by turning of the bolt 74 to draw up the nut 73 and thus place the retainer 71 under tension and cause spreading of the radially outer portions 82 of the retaining arms as described hereinbefore.

Referring to Figure 5, a cover 85 is shown for disposition at the outer side of a vehicle wheel including a wheel body 87 having an outer marginal attachment flange 88 by which it carries a multi-flange tire rim 89 provided with a terminal flange 90. The cover 85 comprises a circular plate adapted to overlie the wheel body and the tire rim as shown in full outline and may comprise a hub cap type of cover wherein it overlies only the wheel body 87 to and into engagement with an annular radially outwardly directed nose bulge 91, as shown in dash outline.

Centrally the cover plate 85 has a crown portion 92 which merges on an axially inwardly directed annular indented portion 93 with a radially outer portion 94. In this instance the indented annular portion 93 is of substantially smaller diameter than the nose bulge 91. Thereby a radially armed spring retainer member on substantially the same order as the retainer member 71 in Fig. 6 is adapted to retain the cover on the wheel. To this end, the spring retainer 95 has generally radially extending spring arms 97 having intermediate turned portions providing generally radially and axially outwardly directed cam sections 98 engageable in camming fulcrumed relation against the shoulder provided by the radially outer side of the indented intermediate cover portion 93. From the cam shoulder portion 98 of the spring fingers generally radially outwardly and axially inwardly extending portions of the portions 99 of the fingers extend to shoulders 100 thereon bottoming against an annular ledge-like shoulder 101 on the radially inner portion of the nose bulge 91 leading to a generally radially inwardly and axially inwardly facing, overhanging offset shoulder 102 against which generally radially outwardly and axially outwardly oblique retaining terminal fingers 103 on the retaining arms are thrustingly bitingly retainingly engageable at their tips. Operation of the retainer spring member 95 is substantially the same as the retainer spring member 71. That is, when the spring retainer 97 is drawn toward the crown 92, in the same way that the retainer 71 is drawn toward the crown 67 in Fig. 6, the retainer spring arms 97 are tensioned and the radially outer portions thereof are caused to expand by camming of the cam shoulders 98 thereof along the cam shoulder of the cover portion 93 to thereby cause the retaining terminals 103 to be driven radially outwardly into thrusting biting engagement with the retaining shoulder 102 on the wheel body nose bulge. It will be understood, of course, that the cover is held in spaced relation to the wheel body by engagement of a portion thereof at the outer margin against either the wheel body or against the tire rim as shown.

In the form of the invention shown in Figs. 8, 9 and 10, a cover 105 is constructed and arranged to be applied to the outer side of a vehicle wheel including a wheel body 107 carrying a tire rim 108 and provided at its center with a bolt-on flange 109 having a central aperture as is usual but with an annular turned up flange 110 that is provided with a radially outwardly projecting overhanging annular lip 111.

The cover 105 may either be of substantially hub cap size so as to engage against the wheel body, but in this instance is shown as a full disk which engages at an annular centering shoulder 112 thereof against a shoulder 113 on the tire rim and has an intermediate portion 114 that merges with a central crown portion 115 of the cover that is of relatively small size to overlie the bolt-on flange 109 and provides a generally conical shoulder 117. Centrally the crown 105 has an indented or depressed portion 118 through a central aperture 119 of which a bolt 120 extends, with a wrench engageable head 121 at the outer side of the depressed portion 118.

For retaining the cover on the wheel, a spring retainer member 122 is provided which comprises a central body member 123 equipped centrally thereof with a threaded boss or nut 124 through which the bolt 120 extends, a stop collar 125 at the axially inner end portion of the bolt 120 limiting the axially inward backed off relation of the nut 124 on the bolt.

Extending radially from the body 123 is a series of circumferentially spaced spring arms 127, here five in number although any suitable number of such arms may be used, each of which has a turned shoulder 128 which bears in slidable camming relation against the shoulder 117 of the cover crown. From the shoulders 128 the resilient fingers 127 extend generally axially inwardly and convergently radially inwardly to terminal portions thereof which are provided with inturned short and stiff generally radially inwardly and axially outwardly directed retaining terminals 129 which are engageable in drawn up thrusting relation behind the lip flange 111 of the bolt on flange of the wheel body.

In applying the cover 105 to the outer side of the wheel, the shoulder 112 is centered on the tire rim and the retaining terminals 129 which are expanded by relaxing of the retainer 122 clear the retaining lip flange 111

(Fig. 9). Then, by drawing up the retainer body 123 by means of the bolt 120, the retaining arm shoulders 128 are caused to slidably cam and fulcrum on the crown shoulder 117 and thus cause the retaining arms 127 to swing radially inwardly and engage behind the lip flange 111. As the retaining fingers are drawn axially outwardly as well as swung radially inwardly, the tips of the retaining fingers 129 effect a strong gripping biting engagement against the lip flange 111 to thereby tensionably draw the cover 105 axially inwardly to hold it firmly on the wheel.

Removal of the cover 105 is effected easily by applying a suitable wrench to the wrench head 121 of the bolt 120 and turning the bolt to loosen or back off the nut 124 and thus relax the retainer 122 for springing open of the retaining fingers 127 for clearing of the fingers 129 from the retaining lip flange 111. Thereupon the cover may be lifted away from the wheel.

In all forms of the cover, the cover body may be made from suitable sheet material such as stainless steel, brass, aluminum or the like, which may be appropriately finished as by polishing and plating, if desired. The retaining spring members may be made from suitable spring metal stock.

In all instances, if desired, the central operating bolts for the retaining devices may be protected by locking devices which may be applied thereover.

It will be understood that modifications and variations may be effected without departing from the scope of the novel concepts of the present invention.

I claim as my invention:

1. In a wheel structure including a tire rim supported by a wheel body and at least one of which has a shoulder structure, a cover for disposition at the outer side of the wheel including a cover member for overlying the wheel body and having therebehind an armed cover retainer including arm terminals movable into and out of retaining engagement with a shoulder structure on the wheel by generally radial relative movement of the retainer arms incident to manipulation of the retainer body, said retainer and the cover member having interengageable means for holding the cover against turning relative to the retainer and the retainer and the shoulder structure on the wheel having means interengaging to hold the retainer corotational with the wheel.

2. In a wheel structure including a wheel body and a tire rim supported thereby at least one of which has a cover retaining shoulder structure, a cover for disposition at the outer side of the wheel including a cover body having therebehind an armed spring cover retainer including a body member manipulable for axial movement behind the cover and a plurality of generally radially extending arms having wheel engaging terminals engageable under retaining shoulder structure on the wheel, said arms having sliding shouldering engagement with the wheel spaced radially from said terminals and said retaining shoulder structure.

3. In a wheel structure including a wheel body having a central bolt-on flange with an opening therethrough defined by a turned flange, a cover for disposition at the outer side of the wheel including a central crown portion having generally inwardly facing oblique shoulder areas, and a spring arm retainer carried by said crown portion and having a body movable axially in the crown portion and spring arms projecting from the body and turned to provide shoulders engageable with the crown shoulder areas, said spring arms projecting generally axially inwardly beyond the crown of the cover and having retaining terminals engageable with said turned flange, said arms being flexibly movable generally radially to swing said retaining terminals generally radially into and out of engagement with said turned wheel flange responsive to generally axial movement of the retainer body and sliding camming movement of the arm shoulders in engagement with said shoulder areas.

4. In a cover for disposition at the outer side of a vehicle wheel, a circular cover body having an inner and an outer side and a central crown portion, said crown portion having on its inner side generally inwardly facing radially and axially oblique shoulder structure spaced radially outwardly from the center of the crown portion, said shoulder areas being disposed within generally inwardly opening and radially extending guide channels, a retainer for the cover having a central portion located inwardly adjacent to the center of the crown portion, said retainer having spring arms slidably engageable in said guide channels on said shoulder structure, cover retaining terminals on the arms located beyond said shoulder structure, and means accessible from the outer side of the crown and having a portion thereof at the inner side of the cover for actuating said central portion of the retainer in an axial direction toward and away from the central portion of the crown, said arm portions being slidably movable on said shoulder structure within said guide channels and being flexibly responsive to move said retaining terminals generally radially between gripping retaining engagement and release positions relative to retaining shoulder means on a wheel incident to said axial movements of said central portion of the retainer.

5. In a wheel structure including a tire rim part and a wheel body part supporting the same, one of said parts having shoulder structure thereon, a cover for disposition at the outer side of the wheel including a circular cover member having a portion for bottoming against the wheel and thereby determining the axially inward disposition of the cover on the wheel, and a retainer for the cover disposed therebehind and having a body behind the central portion of the cover, with resiliently flexible retaining arms projecting therefrom and having intermediate portions thereof shouldering against the back of the cover spaced from said body, said arms having on the free ends thereof terminal portions spaced from the intermediate cover engaging portions for retaining engagement with said shoulder structure, and means carried by the central portion of the cover and accessible from the outer side of the cover and coupled with said retainer body and operable to draw said retainer body axially outwardly and thereby flexibly cam said intermediate arm portions on the cover to flex the arms and move the free ends thereof generally radially into gripping retaining engagement with said shoulder structure and to effect release of the terminal portions from the shoulder structure by movement of the retainer body axially inwardly.

6. In a wheel structure including a wheel body, a tire rim supported thereby and cover retaining shoulder structure, a cover for disposition at the outer side of the wheel including an obliquely dished cover body having therebehind an armed spring cover retainer manipulable for axial movement behind the cover and a plurality of generally radially extending arms having wheel engaging terminals engageable with said retaining shoulder structure on the wheel, said arms, intermediate the terminals and said retainer, being backed up by sliding abutment against an oblique portion of said cover body and being thus cammingly movable both radially and axially of the wheel into and out of retaining engagement with said shoulder structure upon axial movement of said retainer.

7. The structure of claim 6 further characterized by said cover body having therebehind guide channels in which said arms are slidable.

References Cited in the file of this patent

UNITED STATES PATENTS

| | | |
|---|---|---|
| 1,015,907 | Ryder | Jan. 30, 1912 |
| 1,408,910 | Simenowsky | Mar. 7, 1922 |
| 2,108,145 | Short | Feb. 15, 1938 |
| 2,283,371 | Johnson | May 19, 1942 |
| 2,550,222 | Carlin | Apr. 24, 1951 |
| 2,722,460 | Dieterich | Nov. 1, 1955 |
| 2,807,157 | McLin | Sept. 24, 1957 |